United States Patent
Terry et al.

(10) Patent No.: US 8,204,007 B2
(45) Date of Patent: Jun. 19, 2012

(54) METHOD AND APPARATUS FOR CONTROL OF ENHANCED DEDICATED CHANNEL TRANSMISSIONS

(75) Inventors: Stephen E. Terry, Northport, NY (US); Guodong Zhang, Farmingdale, NY (US); Jung-Lin Pan, Selden, NY (US); Peter S. Wang, E. Setauket, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 863 days.

(21) Appl. No.: 11/444,751

(22) Filed: May 31, 2006

(65) Prior Publication Data

US 2007/0025300 A1    Feb. 1, 2007

Related U.S. Application Data

(60) Provisional application No. 60/704,273, filed on Aug. 1, 2005.

(51) Int. Cl.
  *H04W 4/00* (2009.01)
  *H04B 7/216* (2006.01)
  *H04W 72/04* (2009.01)
  *H04W 72/14* (2009.01)
  *H04B 7/00* (2006.01)

(52) U.S. Cl. ........ 370/329; 370/335; 370/431; 370/441; 455/450; 455/451; 455/509; 455/522

(58) Field of Classification Search .................. 370/335, 370/342; 455/522, 69, 451
See application file for complete search history.

(56) References Cited

U.S. PATENT DOCUMENTS 6,567,666 B2   5/2003   Czaja et al.
6,738,370 B2   5/2004   Ostman
(Continued)

FOREIGN PATENT DOCUMENTS

JP        2004-328498        11/2004
(Continued)

OTHER PUBLICATIONS

Third Generation Partnership Project, "Technical Specification Group Radio Access Network; Radio Resource Control (RRC); Protocol Specification (Release 5)," 3GPP TS 25.331 V5.16.0 (Mar. 2006).

(Continued)

*Primary Examiner* — Nick Corsaro
*Assistant Examiner* — Tangela T Chambers
(74) *Attorney, Agent, or Firm* — Volpe and Koenig, P.C.

(57) ABSTRACT

A method and apparatus for controlling enhanced dedicated channel (E-DCH) transmissions are disclosed. An enhanced uplink medium access control (MAC-e/es) entity processes a received scheduling grant to calculate a serving grant. The MAC-e/es entity determines whether both a hybrid automatic repeat request (H-ARQ) process for scheduled data and scheduled data are available. If an H-ARQ process for scheduled data and scheduled data are available, the MAC-e/es entity determines whether a serving grant exists. The MAC-e/es entity calculates a remaining power based on maximum allowed power and restricts an E-DCH transport format combination (E-TFC) based on the remaining power. The MAC-e/es entity selects an E-TFC using the serving grant and generates a MAC-e protocol data unit. The MAC-e/es entity may process the received scheduled grant is at each transmission time interval or may store the received scheduled grant in a grant list until there is E-DCH data to transmit.

37 Claims, 2 Drawing Sheets

U.S. PATENT DOCUMENTS

| | | | |
|---|---|---|---|
| 6,738,730 B2 | 5/2004 | Sato et al. | |
| 6,839,744 B1 | 1/2005 | Kloba et al. | |
| 7,352,709 B2 | 4/2008 | Wakabayashi | |
| 7,376,879 B2 | 5/2008 | Terry et al. | |
| 2004/0052229 A1 | 3/2004 | Terry et al. | |
| 2004/0160936 A1 | 8/2004 | Liu et al. | |
| 2005/0030964 A1* | 2/2005 | Tiedemann et al. | 370/431 |
| 2005/0073985 A1 | 4/2005 | Heo et al. | |
| 2005/0078651 A1 | 4/2005 | Lee et al. | |
| 2005/0185609 A1* | 8/2005 | Malkamaki | 370/328 |
| 2006/0056343 A1* | 3/2006 | Hu et al. | 370/329 |
| 2006/0092972 A1* | 5/2006 | Petrovic et al. | 370/469 |
| 2006/0187844 A1* | 8/2006 | Chun et al. | 370/242 |
| 2006/0209825 A1* | 9/2006 | Carroll et al. | 370/431 |
| 2006/0221907 A1* | 10/2006 | Bachl et al. | 370/335 |
| 2006/0256757 A1* | 11/2006 | Kuusela et al. | 370/335 |
| 2007/0010281 A1* | 1/2007 | Sebire | 455/525 |
| 2007/0168827 A1* | 7/2007 | Lohr et al. | 714/749 |
| 2007/0297360 A1 | 12/2007 | Lohr et al. | |
| 2008/0089296 A1* | 4/2008 | Kazmi et al. | 370/336 |

FOREIGN PATENT DOCUMENTS

| | | |
|---|---|---|
| WO | 2005/069529 | 7/2005 |

OTHER PUBLICATIONS

Third Generation Partnership Project, "Technical Specification Group Radio Access Network; Requirements for support of radio resource management (FDD) (Release 1999)," 3GPP TS 25.133 V3.21.0 (Jun. 2005).

Third Generation Partnership Project, "Technical Specification Group Radio Access Network; Requirements for support of radio resource management (FDD) (Release 1999)," 3GPP TS 25.133 V3.22.0 (Sep. 2005).

Third Generation Partnership Project, "Technical Specification Group Radio Access Network; Requirements for support of radio resource management (FDD) (Release 4)," 3GPP TS 25.133 V4.15.0 (Jun. 2005).

Third Generation Partnership Project, "Technical Specification Group Radio Access Network; Requirements for support of radio resource management (FDD) (Release 4)," 3GPP TS 25.133 V4.17.0 (Mar. 2006).

Third Generation Partnership Project, "Technical Specification Group Radio Access Network; Requirements for support of radio resource management (FDD) (Release 5)," 3GPP TS 25.133 V5.15.0 (Jun. 2005).

Third Generation Partnership Project, "Technical Specification Group Radio Access Network; Radio Resource Control 9RRC); Protocol Specification (Release 6)," 3GPP TS 25.331 V6.9.0 (Mar. 2006).

Third Generation Partnership Project, "Technical Specification Group Radio Access Network; Medium Access Control (MAC) protocol specification (Release 6)," 3GPP TS 25.321 V6.5.0 (Jun. 2005).

Third Generation Partnership Project, "Technical Specification Group Radio Access Network; Medium Access Control (MAC) protocol specification (Release 7)," 3GPP TS 25.321 V7.0.0 (Mar. 2006).

Third Generation Partnership Project, "Technical Specification Group Radio Access Network; Medium Access Control (MAC) protocol specification (Release 6)," 3GPP TS 25.321 V6.8.0 (Mar. 2006).

Third Generation Partnership Project, "Technical Specification Group Radio Access Network; Medium Access Control (MAC) protocol specification (Release 5)," 3GPP TS 25.321 V5.12.0 (Sep. 2005).

Third Generation Partnership Project, "Technical Specification Group Radio Access Network; Medium Access Control (MAC) protocol specification (Release 5)," 3GPP TS 25.321 V5.11.0 (Jun. 2005).

Third Generation Partnership Project, "Technical Specification Group Radio Access Network; FDD Enhanced Uplink; Overall description; Stage 2 (Release 6)," 3GPP TS 25.309 V6.6.0 (Mar. 2006).

Third Generation Partnership Project, "Technical Specification Group Radio Access Network; FDD Enhanced Uplink; Overall description; Satge 2 (Release 6)," 3GPP TS 25.309 V6.3.0 (Jun. 2005).

Third Generation Partnership Project, "Technical Specification Group Radio Access Network; Requirments for support of radio resource management (FDD) (Release 7)," 3GPP TS 25.133 V7.3.0 (Mar. 2006).

Third Generation Partnership Project, "Technical Specification Group Radio Access Network; Requirements for support radio resource management (FDD) (Release 7)," 3GPP TS 25.133 V7.0.0 (Jun. 2005).

Third Generation Partnership Project, "Technical Specification Group Radio Access Network;Requirements for support of radio resource management (FDD) (Release 6)," 3GPP TS 25.133 V6.13.0 (Mar. 2006).

Third Generation Partnership Project, "Technical Specification Group Radio Access Network; Requirements for support of radio resource management (FDD) (Release 6)," 3GPP TS 25.133 V6.10.0 (Jun. 2005).

Third Generation Partnership Project, "Technical Specification Group Radio Access Network; Radio Resource COntrol (RRC); Protocol Specification (Release 6)," 3GPP TS 25.331 V6.6.0 (Jun. 2005).

Third Generation Partnership Project, "Technical Specification Group Radio Access Network; Radio Resource COntrol (RRC); Protocol Specification (Release 7)," 3GPP TS 25.331 V7.0.0 (Mar. 2006).

Third Generation Partnership Project, "Technical Specification Group Radio Access Network; Medium Access Control (MAC) protocol specification (Release 1999);" 3GPP TS 25.321 V3.17.0 (Jun. 2004).

Third Generation Partnership Project, "Technical Specification Group Radio Access Network; Medium Access Control (MAC) protocol specification (Release 4)," 3GPP TS 25.321 V4.10.0 (Jun. 2004).

Third Generation Partnership Project, "Technical Specification Group Radio Access Network; Radio Resource Control (RRC); protocol specification (Release 1999)," 3GPP TS 25.331 V3.21.0 (Dec. 2004).

Third Generation Partnership Project, "Technical Specification Group Radio Access Network; Radio Resource Control (RRC); Protocol Specification (Release 4)," 3GPP TS 25.331 V4.17.0 (Mar. 2005).

Third Generation Partnership Project, "Technical Specification Group Radio Access Network; Radio Resource Control (RRC); Protocol Specification (Release 5)," 3GPP TS 25.331 V5.13.0 (Jun. 2005).

Third Generation Partnership Project, "Technical Specification Group Radio Access Network; Requirements for support of radio resource management (FDD) (Release 5)," 3GPP TS 25.133 V5.17.0 (Dec. 2005).

* cited by examiner

METHOD AND APPARATUS FOR CONTROL OF ENHANCED DEDICATED CHANNEL TRANSMISSIONS

REFERENCE TO RELATED APPLICATIONS

This application claims the benefit of U.S. provisional application No. 60/704,273 filed Aug. 1, 2005, which is incorporated by reference as if fully set forth.

FIELD OF INVENTION

The present invention is related to wireless communication systems. More particularly, the present invention is related to a method and apparatus for controlling enhanced dedicated channel (E-DCH) transmissions.

BACKGROUND

Methods for improving uplink (UL) coverage, throughput and transmission latency are currently being investigated in the third generation partnership project (3GPP). In order to achieve these goals with respect to an E-DCH, the control of UL resources, (i.e., physical channels), has been moved from the radio network controller (RNC) to the Node-B.

In order to reduce complexity and power consumption, execution of wireless transmit/receive unit (WTRU) side enhanced uplink medium access control (MAC-e/es) functions, such as E-DCH transport format combination (E-TFC) selection and multiplexing, remaining transmit power calculation, and processing of absolute grants (AGs) and relative grants (RGs), needs to be properly controlled and coordinated.

SUMMARY

The present invention is related to a method and apparatus for controlling E-DCH transmissions. A MAC-e/es entity of the WTRU receives a scheduling grant and processes the scheduling grant to calculate a serving grant. The MAC-e/es entity determines whether both a hybrid automatic repeat request (H-ARQ) process for scheduled data and the scheduled data are available. If an H-ARQ process for scheduled data and the scheduled data are both available, the MAC-e/es entity determines whether a serving grant exists. The MAC-e/es entity then calculates a remaining power based on the maximum allowed power and restricts an E-TFC based on the remaining power. The MAC-e/es entity selects an E-TFC using the serving grant and generates a MAC-e protocol data unit (PDU) for transmission. The MAC-e/es entity may process the received scheduled grant at each transmission time interval (TTI), or may store the received scheduled grant in a grant list until there is E-DCH data to transmit.

DETAILED DESCRIPTION OF THE PREFERRED EMBODIMENTS

When referred to hereafter, the terminology "WTRU" includes but is not limited to a user equipment (UE), a mobile station, a fixed or mobile subscriber unit, a pager, or any other type of device capable of operating in a wireless environment. When referred to hereafter, the terminology "Node-B" includes but is not limited to a base station, a site controller, an access point (AP) or any other type of interfacing device in a wireless environment.

The present invention is applicable to any wireless communication systems including, but not limited to, universal mobile telecommunication systems (UMTS) frequency division duplex (FDD), UMTS time division duplex (TDD) and time division synchronous code division multiple access (TD-SCDMA) systems.

The features of the present invention may be incorporated into an integrated circuit (IC) or be configured in a circuit comprising a multitude of interconnecting components.

Figure 1:
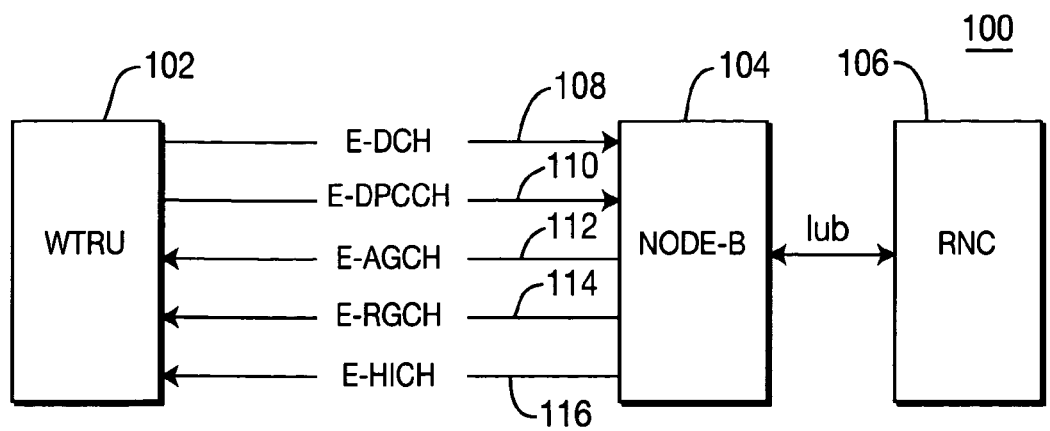
FIG. 1 is a block diagram of a wireless communication system configured in accordance with the present invention.

FIG. 1 is a block diagram of a wireless communication system 100 configured in accordance with the present invention. The system 100 comprises a WTRU 102, a Node-B 104 and an RNC 106. The RNC 106 controls overall E-DCH operation by configuring E-DCH parameters for the Node-B 104 and the WTRU 102, such as initial transmit power level, maximum allowed transmit power or available channel resources per Node-B. Between the WTRU 102 and the Node-B 104, an E-DCH 108, an E-DCH dedicated physical control channel (E-DPCCH), an absolute grant channel (E-AGCH) 112, a relative grant channel (E-RGCH) 114 and an H-ARQ information channel (E-HICH) 116 are established for supporting E-DCH operations.

For E-DCH transmissions, the WTRU 102 sends scheduling information, (also known as a rate request), to the Node-B 104 via the E-DPCCH 110. The Node-B 104 sends a scheduling grant to the WTRU 102 via the E-AGCH 112 or the E-RGCH 114. After E-DCH radio resources are allocated for the WTRU 102, the WTRU 102 transmits UL data via the E-DCH 108. In response to the E-DCH transmissions, the Node-B 104 sends an acknowledgement (ACK) or non-acknowledgement (NACK) message for H-ARQ operation via the E-HICH 116. The Node-B 104 may also respond with rate grants to the WTRU 102 in response to E-DCH data transmissions.

Figure 2:
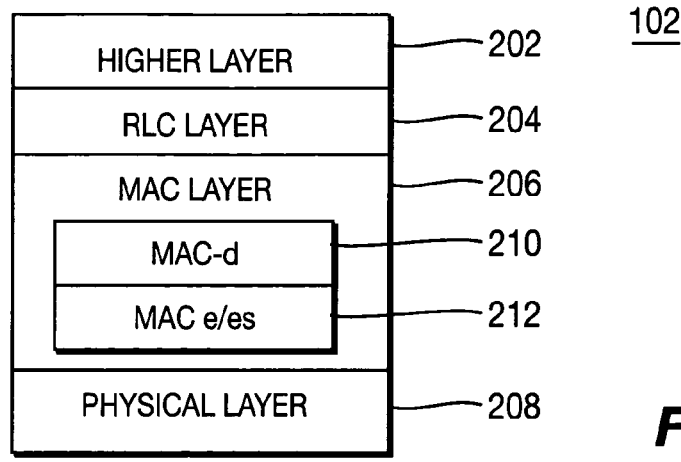
FIG. 2 is a block diagram of a protocol architecture of a WTRU in accordance with the present invention.

FIG. 2 is a block diagram of a protocol architecture of the WTRU 102 in accordance with the present invention. The protocol architecture of the WTRU 102 includes higher layers 202, a radio link control (RLC) layer 204, a MAC layer 206 and a physical layer 208. The MAC layer 206 includes a dedicated channel medium access control (MAC-d) entity 210 and a MAC-e/es entity 212. The MAC-e/es entity 212 handles all functions related to the transmission and reception of an E-DCH including, but not limited to, H-ARQ transmissions and retransmissions, priority of data, MAC-d and MAC-es multiplexing, and E-TFC selection. The RLC layer 204 is provided for in-sequence delivery of data. A re-ordering function is provided in the RLC layer 204 to organize the received data blocks according to the sequence.

Figure 3:
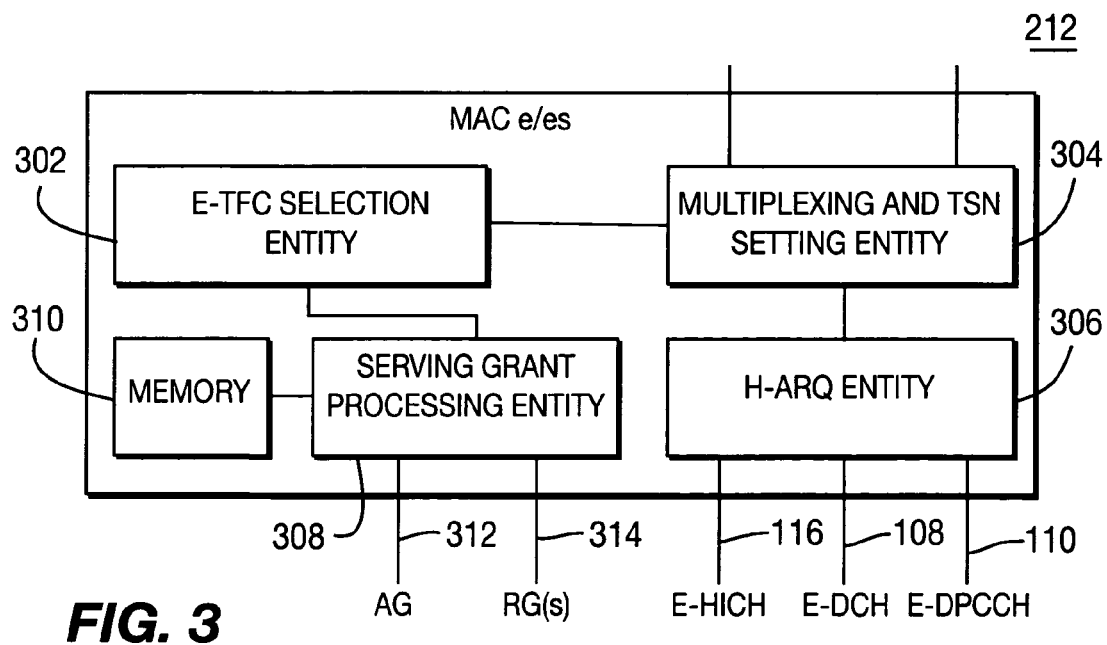
FIG. 3 is a block diagram of a MAC-e/es entity of a WTRU in accordance with the present invention.

FIG. 3 is a block diagram of the MAC-e/es entity 212 in accordance with the present invention. The MAC-e/es entity 212 includes an E-TFC selection entity 302, a multiplexing and transmission sequence number (TSN) setting entity 304, an H-ARQ entity 306, a serving grant processing entity 308 and a memory 310. The serving grant processing entity 308 receives an AG 312 and a RG(s) 314 from the physical layer 208 and processes the AG 312 and the RG(s) 314 to generate a serving grant or stores them in the memory 310. There may be one or more RGs 314. The E-TFC selection entity 302 selects an E-TFC based on the serving grant and performs an arbitration among different data flows mapped on the E-DCH.

The multiplexing and TSN setting entity 304 concatenates multiple MAC-d PDUs into MAC-es PDUs, and multiplexes one or multiple MAC-es PDUs into a single MAC-e PDU to be transmitted in the next TTI as instructed by the E-TFC selection entity 302. The multiplexing and TSN setting entity 304 also manages and sets a TSN per logical channel for each MAC-es PDU.

The H-ARQ entity 306 controls a plurality of H-ARQ processes for storing MAC-e PDUs and retransmitting the MAC-e PDUs when a transmission failure is signaled via the E-HICH. An active H-ARQ process is used for transmission of scheduled data, while a non-active H-ARQ process is not used for transmission of scheduled data. At a given TTI, the H-ARQ entity 306 identifies an H-ARQ process for which a transmission should take place. At the time of a new transmission, the H-ARQ entity 306 provides an H-ARQ profile for all new transmissions and retransmissions of a MAC-e PDU. The H-ARQ profile includes information on the maximum number of transmissions and a power offset with which to configure the physical layer.

The execution of the E-TFC selection by the E-TFC entity 302 depends on the availability of data mapped to the E-DCH with a grant (including an occurrence of a scheduling information rate request trigger) and the availability of an H-ARQ process. An H-ARQ process should be available before E-TFC selection is performed by the E-TFC selection entity 302. The H-ARQ entity 306 identifies to the E-TFC selection entity 302 the availability of H-ARQ processes. H-ARQ processes may be available upon initial configuration, ACK reception, or exceeding the maximum number of retransmissions for any H-ARQ processes.

Figure 4:
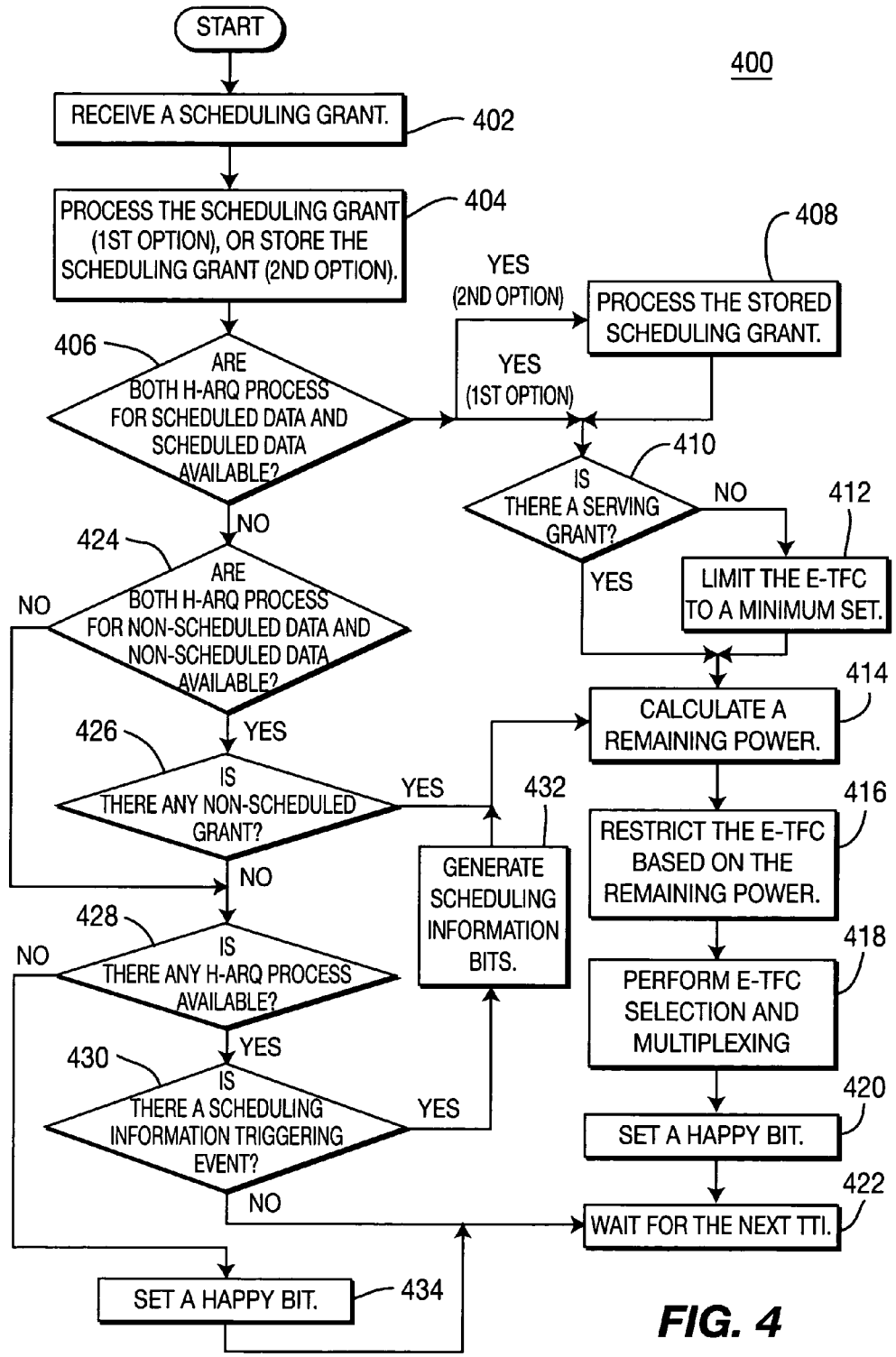
FIG. 4 is a flow diagram of a process for controlling E-DCH transmissions in accordance with the present invention.

FIG. 4 is a flow diagram of a process 400 for controlling E-DCH transmissions in accordance with the present invention. A physical layer receives a scheduling grant via an E-AGCH 112 and E-RGCHs 114 (step 402). After decoding of E-AGCH and E-RGCH, an AG 312 and RG(s) 314 are sent to the serving grant processing entity 308 in the MAC-e/es entity 212. The serving grant processing entity 308 processes the AG 312 and RG(s) 314 to determine a serving grant. The scheduling grant may be an AG 312 from a serving E-DCH cell or an RG(s) 314 from either all cells in a serving E-DCH radio link set (RLS) or a non-serving radio link (RL). The scheduling grant is applied to a specific transmission time interval (TTI). This association is implicit based on the timing of the AG 312 and the RG(s) 314.

Upon reception of the scheduling grant, the serving grant processing entity 308 has two options when there is no data to transmit in the TTI associated to the scheduling grant. The serving grant processing entity 308 may process the received scheduling grant to determine a current serving grant each TTI (step 404). Alternatively, the serving grant processing entity 308 may store the received scheduling grant in a memory 310, (i.e., a grant list), and process the stored scheduling grants when there are E-DCH data to transmit.

The E-TFC selection entity 302 determines whether any H-ARQ processes for scheduled data, (i.e., an active H-ARQ process) and scheduled data are both available (step 406). If an H-ARQ process for scheduled data and scheduled data are both available, the process 400 proceeds to step 410 to determine whether a serving grant exists. Alternatively, if both the H-ARQ process for scheduled data and the scheduled data are both available, and if the second option is implemented, (i.e., the received scheduling grant is stored in the memory 310), the serving grant processing entity 308 processes the scheduling grant stored in the memory 310 to determine a serving grant at step 408 before proceeding to the step 410.

A serving grant indicates a maximum E-DPDCH to dedicated physical control channel (DPCCH) power ratio that the WTRU is allowed to allocate for the upcoming transmission for scheduled data. The serving grant is updated based on the AG and the RG.

In processing the scheduling grant stored in the grant list, the serving grant processing entity 308 may process the last N AGs among the stored scheduling grants to generate the serving grant. The value of N is larger than one.

Alternatively, the serving grant processing entity 308 may maintain only the most recent primary AG and subsequent RGs, including the latest secondary AG in the grant list. A primary AG is an AG received with a primary radio network temporary ID (RNTI) and a secondary AG is an AG received with a secondary RNTI. When a new primary AG is received previous AG and RGs except for the last secondary AG are removed from the grant list when the next transmission requiring a scheduling grant occurs. This reduces significant processing overhead following transmission idle periods.

In addition, whenever a serving cell change occurs, the serving grant processing entity 308 discards all stored AGs and RGs in the grant list. This operation is equivalent to setting an AG to zero and discarding all RGs.

At step 410 if it is determined that there is no serving grant, (i.e., a current serving grant is zero), the E-TFC selection entity 302 limits an E-TFC to a minimum set of E-TFCs (step 412) and calculates a remaining power based on the minimum set of E-TFCs (step 414). If it is determined that there is a serving grant at step 410, the E-TFC selection entity 302 calculates a remaining power based on a maximum allowed power (step 414).

After the remaining power is calculated, the E-TFC selection entity 302 restricts E-TFCs for this TTI based on the remaining power (step 416). The E-TFC selection entity 302 then selects an E-TFC and the multiplexing and TSN setting entity 304 generates a MAC-e PDU by multiplexing MAC-d flows and MAC-es PDUs (step 418). A happy bit which indicates whether the WTRU is satisfied with a current scheduling grant is then set for transmission in this TTI (step 420) and the MAC-e/es entity waits for the next TTI (step 422).

If it is determined at step 406 that either an H-ARQ process for scheduled data, (i.e., an active H-ARQ process), is not available or scheduled data is not available, the E-TFC selection entity 302 then determines whether an H-ARQ process for non-scheduled data and the non-scheduled data are both available (step 424). If an H-ARQ process for non-scheduled data and the non-scheduled data are both available, the E-TFC selection entity 302 further determines whether there is any non-scheduled grant (step 426). The non-scheduled grant is set by an RNC in terms of maximum number of non-scheduled bits that can be included in a MAC-e PDU. The WTRU is allowed to transmit non-scheduled transmissions up to the sum of the non-scheduled grant if multiplexed in the same TTI. If there is a non-scheduled grant, the process proceeds to step 414 to calculate a remaining power and subsequent MAC-e functions, (i.e., steps 416-422), are performed as described hereinbefore.

If it is determined at step 426 that there is no non-scheduled grant, it is determined whether there is any H-ARQ processes available (step 428). If there is an available H-ARQ process, it is determined if scheduling information needs to be reported, (i.e., whether a triggering event occurs) (step 430).

Reporting of scheduling information is triggered by a plurality of different events, which are configurable. Generation of scheduling information is well known in the art and is not within the scope of the present invention. If it is determined at step 430 that there is scheduling information that needs to be transmitted, scheduling information bits are generated (step 432) and the process proceeds to step 414 to calculate a remaining power. Subsequent MAC-e functions, (i.e., steps 416-422), are then performed as described hereinbefore. If there is no scheduling information to be transmitted, no new transmission occurs in this TTI and the MAC-e entity waits for the next TTI (step 422).

If it is determined at step 428 that there is no available H-ARQ process, (which means that the transmission in this TTI is a retransmission), a happy bit is set for the transmission in this TTI to indicate whether the WTRU is satisfied with the scheduling grant (step 434) and the MAC-e entity waits for the next TTI (step 422).

Although the features and elements of the present invention are described in the preferred embodiments in particular combinations, each feature or element can be used alone without the other features and elements of the preferred embodiments or in various combinations with or without other features and elements of the present invention.

What is claimed is:

1. A method, implemented in a wireless transmit/receive unit (WTRU), for controlling enhanced dedicated channel (E-DCH) transmissions, the method comprising:
   receiving a scheduling grant for E-DCH transmission for an upcoming transmission time interval (TTI);
   processing the scheduling grant to calculate a serving grant for E-DCH transmission;
   identifying a hybrid automatic repeat request (H-ARQ) process for use for the upcoming TTI;
   determining whether the identified H-ARQ process for use for the upcoming TTI is an active H-ARQ process, wherein only an active H-ARQ process is used for transmission of scheduled data and a non-active H-ARQ process is not used for transmission of scheduled data;
   determining whether scheduled data is available for transmission in the upcoming TTI;
   on a condition that scheduled data is available for transmission and the identified H-ARQ process is an active H-ARQ process and is available for the transmission of the scheduled data in the upcoming TTI:
   calculating a remaining power available for the upcoming TTI based on a maximum allowed power for the WTRU;
   performing E-DCH transport format combination (E-TFC) restriction based on the remaining power;
   selecting an E-TFC from a set of E-TFCs remaining after E-TFC restriction, wherein the E-TFC selection is based on the serving grant value;
   generating a protocol data unit (PDU) for transmission over an E-DCH in accordance with the selected E-TFC; and
   transmitting the PDU in accordance with the identified H-ARQ process.

2. The method of claim 1 wherein the received scheduling grant is processed at each of a plurality of TTIs.

3. The method of claim 1 wherein the received scheduling grant is stored in a grant list on a condition that there is no data to be transmitted in a TTI associated with the scheduling grant.

4. The method of claim 3 wherein the scheduling grant is an absolute grant or a relative grant, and wherein only the last N absolute grants are stored in the grant list, and the serving grant is calculated based on the last N absolute grants.

5. The method of claim 3 wherein the scheduling grant is an absolute grant or a relative grant, wherein the absolute grant is a primary absolute grant or a secondary absolute grant, and wherein only the most recent primary absolute grant and subsequent relative grants including the latest secondary absolute grant are stored in the grant list to calculate the serving grant.

6. The method of claim 5 wherein on a condition that a new primary absolute grant is received, previous absolute grant and relative grants except for the last secondary absolute grant are removed from the grant list on a condition that a next transmission requiring a scheduling grant occurs.

7. The method of claim 3 wherein all stored scheduling grants in the grant list are discarded on a condition that a serving cell change occurs.

8. The method of claim 1, further comprising:
   on a condition that non-scheduled data is available for transmission in the upcoming TTI and the identified H-ARQ process is a non-active H-ARQ process:
   determining whether a non-scheduled grant exists.

9. The method of claim 8, further comprising:
   on a condition that a non-scheduled grant exists:
   performing E-TFC restriction;
   selecting an E-TFC based on the E-TFC restriction;
   generating a PDU for transmission over an E-DCH in according with the selected E-TFC; and
   transmitting the PDU in accordance with the identified H-ARQ process.

10. The method of claim 8, further comprising:
    determining whether a triggering event for reporting scheduling information occurs;
    on a condition that the triggering event occurs, generating scheduling information bits; and
    on a condition that the triggering event does not occur, waiting for the next TTI.

11. The method of claim 1, further comprising:
    setting a happy bit for transmission in the upcoming TTI to indicate whether the WTRU is satisfied with a current serving grant.

12. The method of claim 1, further comprising:
    generating scheduling information bits on a condition that a triggering event for reporting scheduling information occurs.

13. The method of claim 1 wherein the PDU is an enhanced uplink medium access control (MAC-e) PDU.

14. The method of claim 1 wherein the scheduling grant is received from a Node-B.

15. The method of claim 1 wherein the scheduling grant is an absolute grant.

16. The method of claim 15 wherein the absolute grant is received over an enhanced dedicated channel absolute grant channel (E-AGCH).

17. The method of claim 1 wherein the scheduling grant is a relative grant.

18. The method of claim 17 wherein the relative grant is received over an enhanced dedicated channel relative grant channel (E-RGCH).

19. The method of claim 1 wherein the upcoming TTI is the next TTI after a current TTI.

20. A wireless transmit/receive unit (WTRU) including an enhanced uplink medium access control (MAC-e) entity for controlling enhanced dedicated channel (E-DCH) transmissions, the WTRU comprising:
    circuitry configured to receive a scheduling grant and process the scheduling grant to calculate a serving grant for E-DCH transmission for an upcoming transmit time interval (TTI);

circuitry configured to identify a hybrid automatic repeat request (H-ARQ) process for use for the upcoming TTI;

circuitry configured to determine whether the identified H-ARQ process for use for the upcoming TTI is an active H-ARQ process, wherein only an active H-ARQ process is used for transmission of scheduled data and a non-active H-ARQ process is not used for transmission of scheduled data;

circuitry configured to determine whether scheduled data is available for transmission in the upcoming TTI;

on a condition that scheduled data is available for transmission and the identified H-ARQ process that is an active H-ARQ process and is available for the transmission of the scheduled data in the upcoming TTI:

the WTRU further comprising:

circuitry configured to calculate a remaining power available for the upcoming TTI based on a maximum allowed power;

circuitry configured to perform E-DCH transport format combination (E-TFC) restriction based on the remaining power;

circuitry configured to select an E-TFC from a set of E-TFCs remaining after E-TFC restriction, wherein the E-TFC selection is based on the serving grant value;

a multiplexing entity configured to generate a MAC-e protocol data unit (PDU) for transmission over an E-DCH in accordance with the selected E-TFC; and circuitry configured to transmit the PDU in accordance with the identified H-ARQ process.

21. The WTRU of claim 20 wherein the received scheduling grant is processed at each of a plurality of TTIs.

22. The WTRU of claim 20 wherein the received scheduling grant is stored in a grant list on a condition that there is no data to be transmitted in a TTI associated with the scheduling grant.

23. The WTRU of claim 22 wherein the scheduling grant is an absolute grant or a relative grant, and wherein only the last N absolute grants in the grant list are used to calculate the serving grant.

24. The WTRU of claim 22 wherein the scheduling grant is an absolute grant or a relative grant, wherein the absolute grant is a primary absolute grant or a secondary absolute grant, and wherein only the most recent primary absolute grant and subsequent relative grants including the latest secondary absolute grant are stored in the grant list to calculate the serving grant.

25. The WTRU of claim 24 wherein previous absolute grant and relative grants except for the last secondary absolute grant are removed from the grant list on a condition that a new primary absolute grant is received and a next transmission requiring a scheduling grant occurs.

26. The WTRU of claim 22 wherein all stored scheduling grants in the grant list are discarded on a condition that a serving cell change occurs.

27. The WTRU of claim 20, further comprising circuitry configured to, on a condition that non-scheduled data is available for transmission in the upcoming TTI and the identified H-ARQ process is a non-active H-ARQ process, determine whether a non-scheduled grant exists.

28. The WTRU of claim 27, further comprising circuitry configured to determine whether a triggering event for reporting scheduling information occurs, on a condition that the triggering event occurs, generate scheduling information bits, and on a condition that the triggering event does not occur, waiting for the next TTI.

29. The WTRU of claim 27, further comprising circuitry configured to, on a condition that a non-scheduled grant exists, perform E-TFC restriction, select an E-TFC based on the E-TFC restriction, generate a PDU for transmission over an E-DCH in accordance with the selected E-TFC, and transmit the PDU in accordance with the identified H-ARQ process.

30. The WTRU of claim 20, further comprising circuitry configured to set a happy bit for transmission in the upcoming TTI to indicate whether the WTRU is satisfied with a current serving grant.

31. The WTRU of claim 20 wherein the WTRU is configured to generate scheduling information bits on a condition that a triggering event for reporting scheduling information occurs.

32. The WTRU of claim 20 wherein the scheduling grant is received from a Node-B.

33. The WTRU of claim 20 wherein the scheduling grant is an absolute grant.

34. The WTRU of claim 33 wherein the absolute grant is received over an enhanced dedicated channel absolute grant channel (E-AGCH).

35. The WTRU of claim 20 wherein the scheduling grant is a relative grant.

36. The WTRU of claim 34 wherein the relative grant is received over an enhanced dedicated channel relative grant channel (E-RGCH).

37. The WTRU of claim 20 wherein the upcoming TTI is the next TTI after a current TTI.

\* \* \* \* \*